July 6, 1915. J. H. MATTHEWS. Re. 15,279.

MEANS FOR EMBOSSING.

Original Filed Feb. 16, 1915. 2 Sheets-Sheet 1

WITNESSES

R. H. Wilcoxson

J. H. Harrison

INVENTOR

James H. Matthews, by Edward A. Lawrence, his Attorney

July 6, 1915. J. H. MATTHEWS. Re. 15,279.

MEANS FOR EMBOSSING.

Original Filed Feb. 16, 1915. 2 Sheets-Sheet 2

WITNESSES

R. F. Wilcoxen

J. H. Harrison

INVENTOR

James H. Matthews, by Edward A. Lawrence, his attorney.

UNITED STATES PATENT OFFICE.

JAMES H. MATTHEWS, OF PITTSBURGH, PENNSYLVANIA, ASSIGNOR TO JAS. H. MATTHEWS & CO., OF PITTSBURGH, PENNSYLVANIA, A CORPORATION OF PENNSYLVANIA.

MEANS FOR EMBOSSING.

REISSUED 15,279. Specification of Reissued Letters Patent. Reissued Jan. 31, 1922.

Original No. 1,145,251, dated July 6, 1915, Serial No. 8,496, filed February 16, 1915. Application for reissue filed September 12, 1921. Serial No. 500,258.

*To all whom it may concern:*

Be it known that I, JAMES H. MATTHEWS, a citizen of the United States, and residing in the city of Pittsburgh, in the county of Allegheny and State of Pennsylvania, have invented or discovered new and useful Improvements in Means for Embossing, of which the following is a specification.

My invention comprises new and useful improvements in embossing presses, intended for stamping or forming raised characters in blanks or plates of metal or other material.

More particularly my present invention relates to changeable dies for said presses and in means for presenting the same conveniently to the hand of the operator so that the dies may be quickly changed, thus shortening the intervals between impressions and preventing the mounting of the wrong dies in the press.

Figure 1:
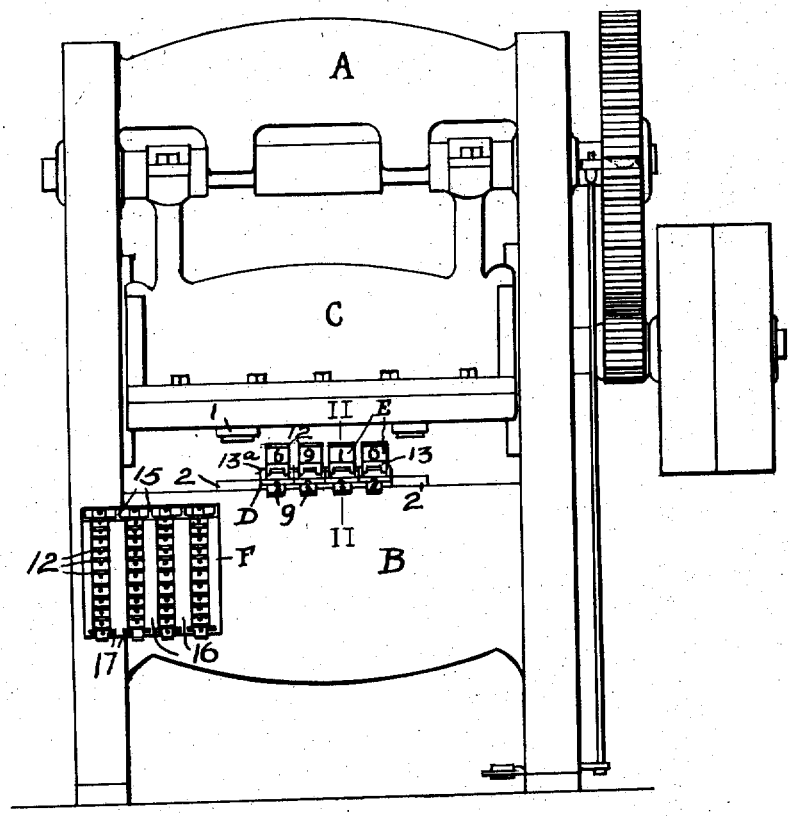
Figure 2:
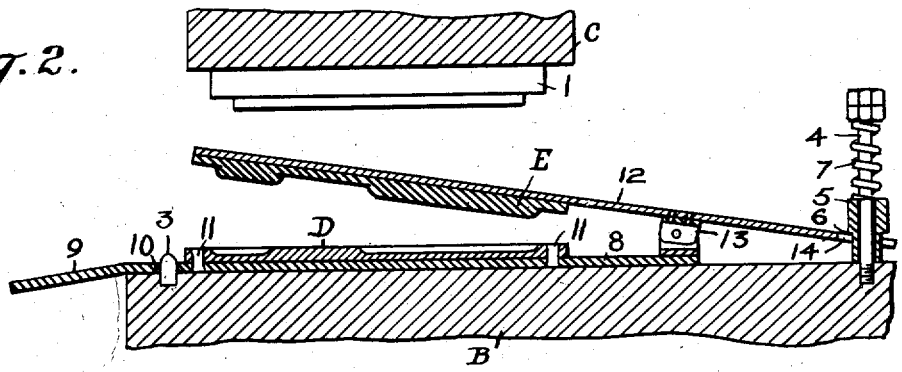
Figure 3:
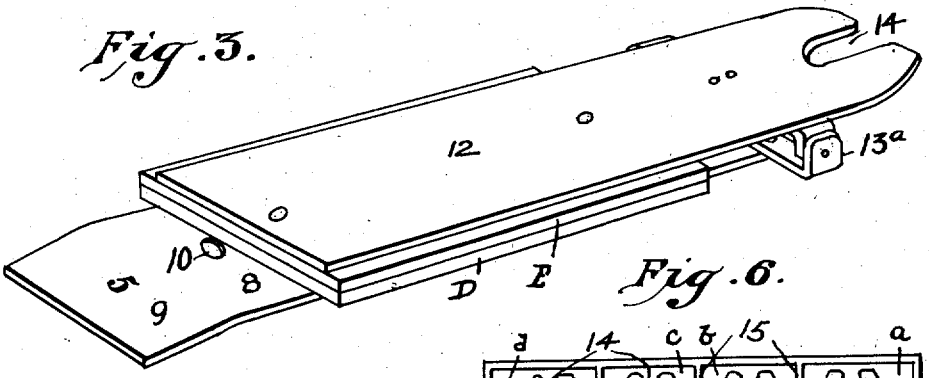
Figure 6:
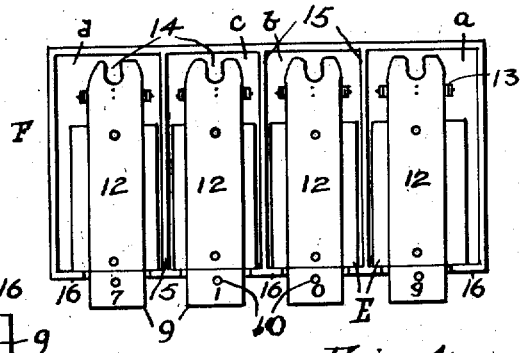
Figure 5:
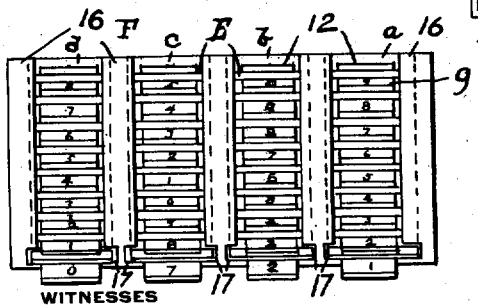
Figure 4:
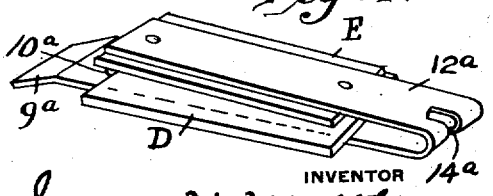

In the accompanying drawings, Figure 1 is a front elevation of an embossing press embodying my improvements; Fig. 2 is an enlarged detail of the same in section along the line II—II in Fig. 1; Fig. 3 is a perspective of one of the changeable dies dismounted; Fig. 4 is a perspective on smaller scale of a modified form of the changeable die; Fig. 5 is an enlarged front elevation of the die magazine with the dies stored therein, and Fig. 6 is a top plan view of the same.

The following is a detailed description of the drawings, reference being first had to Figs. 1, 2 and 3: A is a stamping or embossing press of conventional form provided with a bed B and a ram C. The bed and ram are shown provided, for the sake of illustration, with coacting male and female dies 1 and 2 at either end of the press, the changeable dies, as will be later described, being shown interposed between the same. The dies 1 and 2 form no part of the present invention and therefore are not shown in detail but are preferably of any removable type. In the manufacture of such articles as vehicle license plates, there are usually characters at either end of the plate which do not vary in the numeral series while the intervening characters, such as numbers, vary with each plate or pair of plates. Thus the end characters are changed only at long intervals, if at all, while the intervening numbers increase progressively and must be changed at least in part after each impression or pairs of impressions. For these varying characters, I provide my changeable dies which I will now proceed to describe. In a line parallel with and adjacent to the front edge of the bed B, I provide said bed with a series of upwardly extending studs 3 and in a parallel line adjacent to the rear edge of bed B a corresponding series of headed pins 4 upon which are mounted sliding collars 5 whose upper diameter is enlarged to form shoulders 6. Coiled springs 7 are mounted on said pins between the heads thereof and the collars 5 to resiliently depress the latter.

The removable dies are constructed as follows: 8 is the base plate having its forward end bent downwardly to form the handle 9 and 10 is a hole in plate 8 engaging one of the studs 3 when the die is mounted in the press. The lower die plate D, preferably the female die, is mounted on the upper face of the plate 8, as by rivets 11, said die plate being preferably wider then said base plate but the die portion of plate D being within the lateral limits of said base plate. The top plate 12 bears on its under face the upper or male die plate E. The said top plate is connected to the base plate 8 by means of a pair of pivoted together brackets 13 and 13[a] which are respectively riveted or otherwise secured to said base and top plates. The top plate 12 is extended rearwardly and provided at its end with a notch 14, which engages the collar 5 under its shoulder 6 on one of the pins 4. The changeable die is readily mounted on the bed B by first engaging the notch 14 under the shoulder 6 of one of the spring pins 4 and snapping the hole 10 down over the corresponding stud 3. The die may be removed from the bed by lifting the plate 8 until the stud 3 is disengaged from the hole 10 and drawing the die forward until the notch 14 is disengaged from the collar 5. The effect of the spring 7 is to hold the die open, as shown in Fig. 2 when the ram C is raised so that the blanks may be readily inserted and removed. When the ram is depressed, the spring 7 is compressed and the die is forced closed.

It is evident that the dies may be quickly changed on the bed of the press as required. In embossing numbers on blanks the first die to the right in Fig. 1 is the unit die; the next to the left the tens die; the next to the left the hundreds die; and the fourth the thousands die. By increasing the number of positions for dies any number may be embossed. Where a series of numbers running say from one to nine thousand, nine hundred and ninety-nine, are to be impressed, the "1" die is first mounted on the units position and the desired number of impressions made; the "2" die is then substituted and so on until the number ten is reached when the "0" die is mounted on the units position and the "1" die on the tens position. In a similar manner the dies are changed and added to the hundreds and thousands positions until the highest number above named is reached.

In Fig. 4 I show a modified form of changeable die wherein the lower and upper dies are mounted on the ends of a loop $12^a$ of spring metal whose lower end is prolonged to form the handle $9^a$ and provided with a hole $10^a$ to accommodate the stud 3 of the bed B. The rear end of the loop may be notched as at $14^a$ to engage the headed pin 4 to hold the die removably in place in the bed. In this case the die is normally held open by the resiliency of the loop $12^a$ and the spring 7 is not required.

One of the chief merits of my changeable dies is the facility with which they may be interchanged to produce the required number on a series of blanks and it is therefore highly important that the dies be presented to the hand of the operator in such a manner that no sorting will be required but they may be picked up and inserted in the press without examination. For this purpose, I provide a magazine or case F which is secured to the press in a convenient position, as shown in Fig. 1. Said magazine is in the form of a metal box having a solid back, sides and bottom, and divided by vertical partitions 15 in compartments *a*, *b*, *c*, *d*, etc., equal in number to the number of changeable die positions on the bed of the press. Thus compartment *a* is for the units dies; compartment *b* for tens dies, &c. The fronts of the compartments are partially closed by the wing partitions 16 leaving a central vertical slot of sufficient width to permit the ends or handles 9 of the dies to protrude. The bottoms of said wing partitions are cut away as at 17 so that the bottom die in a compartment may be readily withdrawn forwardly permitting the superimposed dies to drop down in the compartment.

The dies are arranged in the compartments in numeral series from the bottom upward so that as a die is withdrawn at the bottom, the die of the next higher number takes its place and is next withdrawn, the dies as they are removed from the press being inserted in the top of the compartment, so that the necessary rotation is maintained. To facilitate the withdrawal of the dies from the compartments, the magazine is preferably inclined forward, as shown in Fig. 1.

While my removable dies are primarily intended for the class of work above referred to, they may be used for any character of embossing with equal facility.

It is evident from the foregoing that by means of my invention the process of embossing is greatly simplified and facilitated and consequently cheapened.

What I desire to claim is:—

1. A changeable die member for use in an embossing press and comprising a lower die plate adapted to be fixed in said press, and an upper coacting die plate mounted on and attached to said lower die plate, and, when in said press held out of contact with said lower die plate when the press is open but brought into embossing contact with said lower die plate when said press is closed.

2. In combination with a press provided with a bed and a ram, a changeable die for said press and comprising a lower die plate adapted to be removably mounted on said bed and an upper die plate connected to said lower die plate, but unattached to the ram and adapted to be forced down against the same by said ram.

3. In combination with a press provided with a bed and a ram, a changeable die for said press and comprising a lower die plate adapted to be removably mounted on said bed and an upper die plate connected to said lower die plate, but unattached to the ram and adapted to be forced down against the same by said ram, and resilient means for raising said upper die plate when said ram is elevated.

4. In combination with a press provided with a bed and a ram, a changeable die for said press comprising a lower die plate adapted to be removably mounted on said bed and an upper die plate connected to said lower die plate, but unattached to the ram and adapted to be forced down against the same by said ram, and means mounted on said bed and engaging said second die plate to raise the same when said ram is elevated.

5. In combination with a press provided with a ram and a bed, said bed being provided with a stud, a changeable die for said press comprising a lower die plate provided with a hole adapted to engage said stud and an upper die plate in hinged attachment to said lower die plate, said upper die plate being unattached to said ram, and adapted to be forced down on said lower die plate by the descending ram.

6. In combination with a press provided with a ram and a bed, said bed being provided with a stud, a changeable die for said press comprising a lower die plate provided with a hole adapted to engage said stud and an upper die plate in hinged attachment to said lower die plate and adapted to be forced down on said lower die plate by the descending ram, said upper die plate being unattached to said ram, and resilient means for raising said upper die plate when said ram is elevated.

7. In combination with a press provided with a ram and a bed, said bed being provided with a stud, a changeable die for said press comprising a lower die plate provided with a hole adapted to engage said stud and an upper die plate in hinged attachment to said lower die plate and adapted to be forced down against the same by the descending ram, said upper die plate being unattached to said ram, and means mounted on said bed for raising said upper die plate when said ram is elevated.

8. In combination with a press provided with a bed and a ram, a plurality of seats on said bed, a set of changeable dies for said press, exceeding in number the seats in the bed and in permutation applicable to and removable from said seats, each of said changeable dies comprising a lower die plate adapted to be removably mounted in a seat on said bed and an upper die plate connected to said lower die plate, but unattached to the ram and adapted to be forced down against the same by said ram.

In testimony whereof I have hereunto set my hand this 10th day of September, 1921, at Pittsburgh, Pennsylvania.

JAMES H. MATTHEWS.

Witness:

FRANCES J. TOMASSON.